United States Patent [19]
Nelson

[11] Patent Number: 4,568,215
[45] Date of Patent: Feb. 4, 1986

[54] LATERALLY ADJUSTABLE FASTENING ASSEMBLY

[75] Inventor: John F. Nelson, New Lenox, Ill.

[73] Assignee: Illinois Tool Works Inc., Chicago, Ill.

[21] Appl. No.: 553,453

[22] Filed: Nov. 21, 1983

[51] Int. Cl.[4] .............................................. F16B 5/12
[52] U.S. Cl. ........................................ 403/13; 403/266; 403/270; 403/406.1; 24/297; 24/628; 24/693; 24/682; 411/510; 411/171; 411/337; 52/511; 52/506
[58] Field of Search ............... 403/270, 271, 266, 406, 403/13, 14; 24/297, 453, 628, 614, 693, 682, 627, 662, 90 HA; 411/171, 508, 509, 510, 337, 352, 353; 52/511, 506; 156/359, 580

[56] References Cited

U.S. PATENT DOCUMENTS

| 3,580,793 | 5/1971 | Hewitt | 156/73.5 |
|---|---|---|---|
| 3,771,275 | 11/1973 | Seckerson | 403/406 |
| 3,810,279 | 5/1974 | Swich et al. | 411/509 |
| 3,822,821 | 7/1974 | Clarke | 228/112 |
| 3,916,756 | 11/1975 | Yoda | 24/682 |
| 4,312,165 | 1/1982 | Mizusawa | 411/510 |
| 4,393,551 | 7/1983 | Wollar et al. | 411/509 |
| 4,422,276 | 12/1983 | Paravano | 411/510 |
| 4,427,328 | 1/1984 | Kojima | 411/508 |
| 4,477,307 | 10/1984 | Cearlock et al. | 24/90 HA |

FOREIGN PATENT DOCUMENTS

| 670707 | 9/1963 | Canada | 24/297 |
|---|---|---|---|
| 784528 | 10/1957 | United Kingdom | 24/693 |
| 1375619 | 11/1974 | United Kingdom | 411/171 |

Primary Examiner—Cornelius J. Husar
Assistant Examiner—Todd G. Williams
Attorney, Agent, or Firm—D. I. Roche; J. P. O'Brien; T. W. Buckman

[57] ABSTRACT

A fastening system including a two-part laterally adjustable fastener comprised of an apertured base and a headed elongated member. The head of the member is captivated in a recess in the base as the base is welded to an article. Complementary surface formations are formed on the base and the article to facilitate positioning of the base on the article during a welding operation.

13 Claims, 7 Drawing Figures

LATERALLY ADJUSTABLE FASTENING ASSEMBLY

BACKGROUND AND SUMMARY OF THE INVENTION

The present invention relates to fasteners, and in particular to fasteners for use in assemblies of various types such as automobiles and appliances which require lateral adjustment. The increased use of polymeric materials in the automobile, appliance and other industries has created a need for new ways of connecting such materials to each other as well as to different materials.

The present invention is particularly pertinent in welding operations such as friction, ultrasonic, and solvent welding and simplifies the connection of parts requiring alignment.

It is an object of the present invention to simplify assembly of weldable parts.

A further object of the present invention is to simplify the manufacture of articles which comprise parts of assemblies.

Yet another object is to provide means for preassembling adjustable parts of such assemblies.

Another object is to provide weldable fasteners which are laterally adjustable relative to an article to which they are welded.

Still another object is to provide means for properly positioning and spacing weldable fasteners with respect to articles to which they are welded.

Another object is to provide a fastener for making sealed and non-rattling connections between weldable articles and workpieces to which they are attached.

These and other objects of the invention are achieved with a fastening system which includes an article to be fastened and a two-part preassemblable fastener. The fastener is comprised of a base with an apertured recess surrounded by a weld surface formed on a laterally extending flange and an elongate fastening element. The head of the element fits loosely in the recess of the base and is adjustable therein. The shank of the fastening element extends through the aperture in the recessed portion of the base. A molded formation is created in the article to be fastened in order to provide a rough placement guide. Once roughly positioned the base is welded to the article while the fastening element is captivated within the recess. The shape of the inner part of the molded formation such that welding is preventing between the fastening element and the article, whereby fine adjustment can be made between the article to be fastened and a workpiece. The result is an easier assembly operation and simplified molding of parts.

The objects and advantages of the invention will become apparent upon a reading of the following specification, read in conjunction with the accompanying drawings.

DETAILED DESCRIPTION OF THE INVENTION

Figure 1:
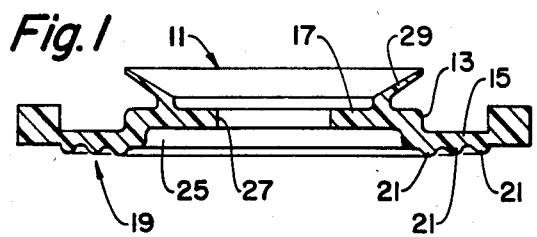
FIG. 1 is a sectional view of the base of the fastener of the present invention.
Figure 2:
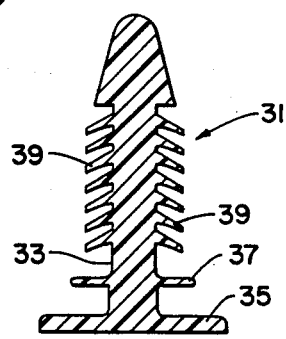
FIG. 2 is a sectional view of the fastening element of the present invention.

Referring to the drawings wherein the same numerals have been employed to designate similar parts throughout the various figures, FIGS. 1 and 2 show the two parts of the fastener of the present invention in an unassembled condition. The base portion 11 shown in FIG. 1 is comprised of a generally low-profile cylinder 13 with an outwardly directed annular flange 15 at the lower end of the cylinder 13 and an inwardly directed rim 17 at the opposite end of the cylinder 13. The flange 15 has a weld surface 19 which includes a series of circular ribs 21. The cylinder 13 forms a recess 25 in the base 11, and the recess 25 communicates with an aperture 27 in the rim 17. A relatively thin tapering frusto-conical skirt 29 depends from the rim 17.

The fastening element 31 shown in FIG. 2 has an elongated shank 33 with a head 35 at one end. The element 31 shown has laterally extending prongs 39, but could be any of a variety of fasteners including push, snap, and resilient self-expanding types. A collar 37 projects outwardly from said shank near the head 35.

Figure 3:
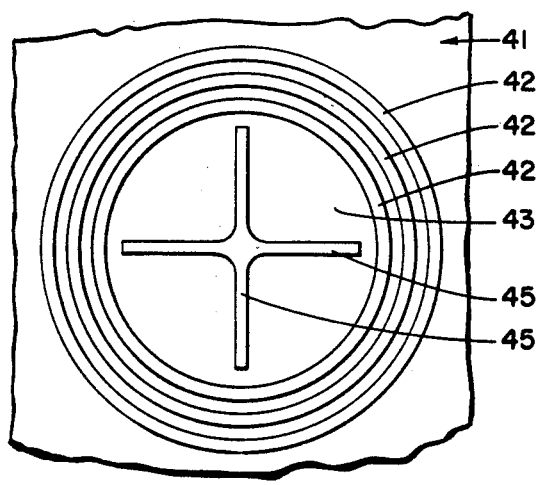
FIG. 3 is an elevational view of a portion of an article to be fastened in accordance with the present invention.

FIG. 3 shows concentric rings 42 molded in an article 41. The rings 42 protrude from the inside surface 43 of the article. The rings 42 on the article 41 and the annular ribs 21 on the base 11 are complimentary in shape such that the base 11 can be positioned on the article at a specific location. The interfitting complimentary surface configurations of the ribs 21 and the rings 42 facilitate welding of the base 11 to the article 41. The protruding cross members 45 form an abutment against which the head 35 can react after attachment of the base 11 to the article 41.

Figure 4:
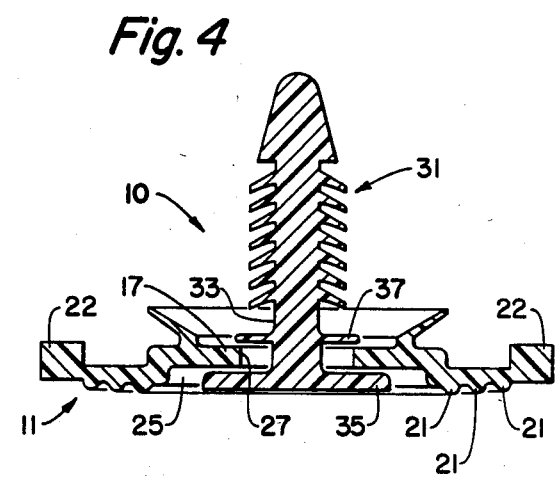
FIG. 4 is a sectional view of the preassembled fastener of the present invention.
Figure 5:
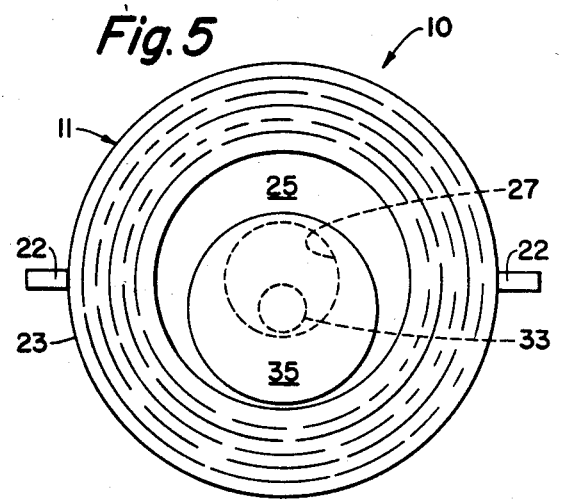
FIG. 5 is a bottom end view of the fastener of the present invention.

FIGS. 4 and 5 show the two-part fastener 10 assembled but unattached to the article 41. The ribs 21 are concentric and head 35 fits loosely within the recess 25 so that the fastening element 31 can be moved laterally relative to the base 11. The collar 37 is snappingly engaged by the rim 17 as the shank 33 including the collar 37 is inserted through the aperture 27 in the rim 17. Either the collar or the inner portion of the rim or both may be resiliently flexible to achieve the engaging relationship between the two components of the fastener 10. Once assembled the fastener is ready to be attached. In the embodiment shown the base 11 has driving tabs 22 formed at the outer edge 23 thereof. The tabs 22 are used to spin the base and achieve a friction weld between the base and the article 41. While the preferred embodiment of the invention is adapted for friction welding, it is clear that the invention has applicability when other methods of attachment are used.

FIG. 5 shows the lateral adjustability of the fastener. The head 35 can move laterally within the recess 25, because the diameter of the shank 33 is significantly less than the diameter of the aperture 27.

The tabs 22 are located adjacent to the weld surface 19 so that when an optimal melt condition exists at the interface between the surface 19 and the article 41, the tabs will yield and thereby terminate the application of rotative forces to the fastener. This technique is the subject of a U.S. Pat. No. 4,777,307 and copending patent application Ser. No. 462,270, which are assigned to the assignee of the present invention; and which applications are hereby incorporated by reference and made a part hereof.

To attach the fastening assembly of FIG. 4 (base 11 and associated fastening element 31) onto molded article 41, the assembly is positioned with the circular ribs or indentations 21 interfitting over the upper edge of concentric rings 42. This complementary interfitting relationship positively locates the base 11 during the spin welding operation. as fully described in U.S. Pat. No. 4,477,307, tabs 22 on base 11 are used to spin the base until a friction weld is achieved between base 11 and molded article 41. This friction weld condition is depicted in FIG. 6.

Figure 6:
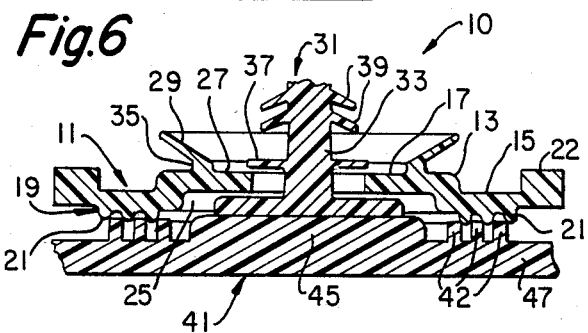
FIG. 6 is a sectional view of the pressembled fastener of the present invention positioned in interfitting relationship on the upper edge of a plurality of rings integrally formed on the article to be fastened prior to the friction weld operation.

Referring to FIG. 6, there is depicted the preassembled fastener 11 positioned on the upper edge of the rings 42 of article 41 with ribs 21 of base 11 disposed in interfitting relationship with rings 42. This interfitting relationship ensures the proper location of the base 11 on article 41. When the base 10 is spun to achieve a friction weld between base 10 and article 41, the rings 42 guide the ribs 21 in a circular path until a friction weld is achieved.

Figure 7:
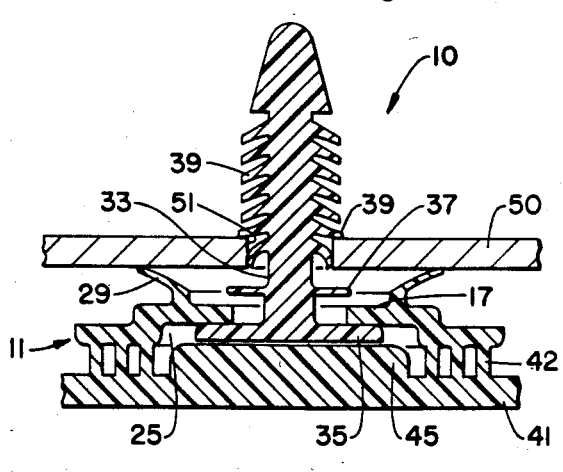
FIG. 7 is a sectional view of the fastener welded to the article to be fastened showing the workpiece to which the article is attached.

FIG. 7 shows a complete assembly including the fastener 10, the article 41 to which the fastener 10 is welded, and the apertured panel 50 to which the article 41 is mounted. The ability for lateral movement of the fastening element within the recess 25 allows an installer to insert the shank 33 into the aperture 51 even if the article 41 is not laterally adjustable. This is particularly important in making blind connections where tolerances accumulate and where the likelihood of consistently exact aperture and fastener alignment is remote. The rings 42 project from the article 41. The height of the rings 42 may be specified to achieve a desired spacing in a direction generally perpendicular to the planes of the panel 50 and article 41. It may be desirable to form a surface indentation in the article 41 if the article is thick enough. If several fasteners are used, various heights can be specified to achieve an overall slope of the article 41 relative to the panel 50. This allows the designer to specify a single fastener of several subassemblies.

It should also be noted that the skirt 29 has two functions. One being to prevent moisture from entering through the aperture 51 and reaching the article 41 which may be part of the interior finish of an automobile, for example. The second function is to maintain tension in the shank 33 of the fastening element. The skirt will resiliently deflect upon insertion of the shank 33 into the apertured panel 50, and as the deflection begins at least one or more set of prongs 39 can pass through the panel 50. Once insertion force is stopped the resilience of the skirt will react against one side of the panel 50, while the prongs 39 engage the opposite side. The resulting tension in the shank 33 insures a snug non-rattling connection between the fastener 10, the article 41 and the panel 50.

The cross members 45 are formed in the article 41 to maintain the perpendicularity of the shank 33 relative to the rim 17. The cross ribs 45 stabilize the shank 33 when bending forces are applied to the shank 33. Upon the application of bending forces, one side of the head 35 abuts the ribs 45, and the other side of the head abuts the rim 17. Preferably, there is only a very small amount of possible axial movement of the head 35 within the recess 25, so that resistance to bending occurs with a minimum of deflection. Some small amount of axial movement of the head, however, is desirable so that the fastening element 31 can be moved laterally as discussed above. That is, the axial distance between the rim 17 and the ribs 45 of the welded assembly is preferably slightly greater than the thickness of the head 35. It should also be noted that the cross ribs 45 are designed to support the head 35 with a minimum of surface contact so as to prevent inadvertent fusion between the fastening element and the article 41.

The invention has been described with reference to a preferred embodiment. However, numerous alternatives, modifications and substitutions may be made without departing from the spirit and scope of the appended claims.

I claim:

1. A fastener in combination with a molded workpiece, said fastener comprising a base having a center portion with a centrally disposed aperture and having a peripherally extending weld surface of a material that can be fuzed to said molded workpiece, a fastening element having a head and a shank for securement to a second workpiece, said center portion of said base having a recess facing in the direction of said weld surface, said head having a cross dimension larger than the diameter of said aperture to cause said head to be axially trapped in said recess behind said aperture and said shank extending through said aperture, locating means integrally formed on said molded workpiece for retaining said base at a predetermined location of said molded workpiece as said base is friction welded thereon, and complementary locating means integrally formed on said weld surface interfitting with said locating means for guiding said base to spin in a predetermined circular patch during a friction welding operation.

2. A fastener according to claim 1, wherein said base includes several concentric circular ribs integrally formed on said weld surface of said base and wherein said locating means comprises several complimentary concentric circular ring weld surfaces on the second workpiece that interfit with said several concentric circular ribs.

3. The combination as defined in claim 1 including at least one yielding driving tab adjacent said weld surface of said base, said tab adapted to be used to rotate said fastener during a friction welding operation and said tab being adapted to yield when an optimal melt condition exists between said weld surface and said molded workpiece.

4. The combination as defined in claim 1 wherein said fastener includes sealing biasing means for preventing the passage of fluids through said second workpiece and for maintaining tension in said fastening element.

5. The combination as defined in claim 4 wherein said sealing biasing means comprises a continuous annular flexible generally frustoconical skirt extending from said base.

6. The combination as defined in claim 1 further comprising means for stabilizing said fastener element against bending forces applied thereto.

7. The combination as defined in claim 6, wherein said means for stabilizing includes cross ribs formed on said molded workpiece.

8. The combination as defined in claim 7, wherein after said friction welding operation said cross ribs are axially spaced from said base by a distance at least as great as the thickness of said head.

9. A fastener in combination with a molded workpiece, said fastener comprising a generally annular base having a centrally disposed cylindrical portion, and annular weld surface on a flange extending laterally outwardly from an end of said cylindrical portion, an apertured inwardly directed rim formed at the other end of said cylindrical portion, an elongated fastening element having a rounded head and shank, said head being radially larger than said aperture in said rim and being radially smaller than said cylindrical portion, and at least one annular indentation formed in said weld surface, and said molded workpiece having locating means formed on its surface for interfitting with said at least one annular indentation for guiding said base to spin in a predetermined circular path during a friction welding operation.

10. The combination as defined in claim 9, further comprising means for stabilizing said fastener element against bending forces applied thereto, said stabilizing means includes a pair of intersecting ribs integrally formed on said molded piece in direct alignment with said centrally disposed cylindrical portion of said base.

11. The combination as defined in claim 10, wherein said pair of ribs are perpendicularly disposed and are axially spaced from said base by a distance slightly greater than the thickness of said head after said friction welding operation is complete.

12. A combination according to claim 9 wherein said locating means is comprised of at least one annular formation molded integrally with said molded workpiece which fits complementarily with said annular indentation in said weld surfaces.

13. A combination according to claim 9, wherein said locating means comprises a plurality of concentric annular protrusions molded integrally with said molded workpiece, and said at least one indentation comprises a mating plurality of concentric annular indentations on said weld surface.

* * * * *